US012259580B2

(12) United States Patent
Luo

(10) Patent No.: US 12,259,580 B2
(45) Date of Patent: Mar. 25, 2025

(54) SUBSTRATE FOR OPTICAL FIBER ARRAY

(71) Applicant: Suzhou TFC Optical Communication Co., Ltd., Suzhou (CN)

(72) Inventor: Zhiguo Luo, Suzhou (CN)

(73) Assignee: Suzhou TFC Optical Communication Co., Ltd., Suzhou (CN)

( * ) Notice: Subject to any disclaimer, the term of this patent is extended or adjusted under 35 U.S.C. 154(b) by 202 days.

(21) Appl. No.: 18/059,344

(22) Filed: Nov. 28, 2022

(65) Prior Publication Data

US 2024/0103228 A1 Mar. 28, 2024

(30) Foreign Application Priority Data

Sep. 23, 2022 (CN) .......................... 202222534749.7

(51) Int. Cl.
*G02B 6/36* (2006.01)
(52) U.S. Cl.
CPC ......... *G02B 6/3636* (2013.01); *G02B 6/3664* (2013.01)
(58) Field of Classification Search
None
See application file for complete search history.

(56) References Cited

U.S. PATENT DOCUMENTS

| | | | | |
|---|---|---|---|---|
| 5,907,649 A * | 5/1999 | Acklin | ................... | G02B 6/423 385/14 |
| 6,795,634 B2 * | 9/2004 | Jeong | ................... | G02B 6/3652 385/137 |
| 7,587,108 B2 * | 9/2009 | Carpenter | ............ | G02B 6/3636 385/137 |
| 7,603,021 B2 * | 10/2009 | Watanabe | ............ | G02B 6/3636 385/137 |
| 8,165,432 B2 * | 4/2012 | Ohta | ..................... | G02B 6/4214 385/88 |
| 8,235,604 B2 * | 8/2012 | Suzuki | ................. | G02B 6/4249 385/88 |
| 8,781,287 B2 * | 7/2014 | Flanders | .............. | A61B 5/0084 385/137 |
| 2002/0051618 A1 * | 5/2002 | Ten Eyck | ............. | G02B 6/3676 385/137 |
| 2002/0076189 A1 * | 6/2002 | McMullin | ............ | G02B 6/3885 385/137 |
| 2002/0168168 A1 * | 11/2002 | Iravani | ................. | G02B 6/3636 385/136 |
| 2003/0081926 A1 * | 5/2003 | Jeong | ................... | G02B 6/3636 385/137 |
| 2003/0169995 A1 * | 9/2003 | Song | ..................... | G02B 6/368 385/137 |

(Continued)

*Primary Examiner* — Jerry Rahll
(74) *Attorney, Agent, or Firm* — AVEK IP, LLC

(57) ABSTRACT

Some embodiments of the disclosure provides a substrate for optical fiber array and the disclosed substrate fixes the fiber by epoxy. In some embodiments, the substrate includes a main body, a first holding groove, and a second holding groove. The first holding groove is notched along a width direction of the main body for holding a stripped optical fiber by epoxy. The second holding groove is an arc-shaped groove and connected with the first holding groove. The second holding groove extends along a notching direction of the first holding groove for holding an unstripped optical fiber. In other embodiments, a groove is notched along a length direction of the main body to prevent epoxy overflow.

11 Claims, 3 Drawing Sheets

(56) References Cited

U.S. PATENT DOCUMENTS

| | | | |
|---|---|---|---|
| 2003/0219208 A1* | 11/2003 | Kwon | G02B 6/3692 |
| | | | 385/49 |
| 2004/0114859 A1* | 6/2004 | Colgan | G02B 6/3692 |
| | | | 385/31 |
| 2009/0297099 A1* | 12/2009 | Benjamin | G02B 6/4257 |
| | | | 385/32 |
| 2012/0033920 A1* | 2/2012 | Haley | G02B 6/3885 |
| | | | 385/78 |
| 2018/0136409 A1* | 5/2018 | Mitose | G02B 6/3616 |
| 2018/0284356 A1* | 10/2018 | Haase | G02B 6/3869 |
| 2021/0333489 A1* | 10/2021 | Yu | G02B 6/40 |
| 2023/0296849 A1* | 9/2023 | Nakamura | G02B 6/3885 |
| | | | 385/78 |

* cited by examiner

SUBSTRATE FOR OPTICAL FIBER ARRAY

CROSS REFERENCE TO RELATED APPLICATIONS

This application claims priority to Chinese patent application number 202222534749.7, filed on Sep. 23, 2022, the disclosure of which is incorporated by reference herein in its entirety.

FIELD OF THE DISCLOSURE

The disclosure relates generally to the field of optical communication products. More specifically, the disclosure relates to the field of a substrate for optical fiber array.

BACKGROUND

The substrate for optical fiber array is a commonly used product in the field of optical communication for fixing optical fibers by epoxy. Traditionally, the substrate of the prior art has one or more of the following defects. First, the epoxy used to fix optical fibers between the substrate and the lid is a hard type of epoxy and is easy to spread to the rear of the substrate and the optical fiber coating. When being bent, the optical fiber will meet cracks and breakages in its coating that are covered by the hard epoxy. Second, the binding strength of the fixing epoxy at the rear of the substrate is not strong enough to firmly fix the optical fiber. As a result, the optical fiber will break at the stripping point when being bent by a lateral pulling/pushing force. Third, without a fixed positioning datum, the placement of the stripped optical fibers is usually inconsistent.

The disclosure in this background section only serves to provide the general background information for the present disclosure and it should not be regarded as recognition or implication in any form that it has been the prior art known to those of ordinary skill in the art.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a substrate for optical fiber array. The disclosed substrate includes a main body, a first holding groove, and a second holding groove. The first holding groove is notched along a width direction of the main body for holding a stripped optical fiber by epoxy. The second holding groove is an arc-shaped groove and connected with the first holding groove. The second holding groove extends along a notching direction of the first holding groove for holding an unstripped optical fiber.

Optionally, the second holding groove is wider than the first holding groove.

Optionally, the substrate further includes a lid arranged on top of the first holding groove to cover and to fix the stripped optical fiber.

Optionally, the main body is provided with a plurality of the first holding grooves, the plurality of the first holding grooves being equally spaced along a length direction of the main body.

Optionally, a groove is notched along a length direction of the main body to prevent epoxy overflow.

Optionally, the groove intersects the second holding groove, the groove divides the second holding groove into a first holding section and a second holding section, and a bottom surface of the first holding section is connected with the first holding groove.

Optionally, the groove has a depth of 0.2 mm to 0.3 mm.

Optionally, the groove is a square-shaped groove.

Optionally, the arc-shaped groove has a radius of 20 mm to 30 mm.

Optionally, the first holding groove is a V-shaped groove.

BRIEF DESCRIPTION OF THE DRAWINGS

Illustrative embodiments of the present disclosure are described in detail below with reference to the attached drawing figures.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

Figure 1:
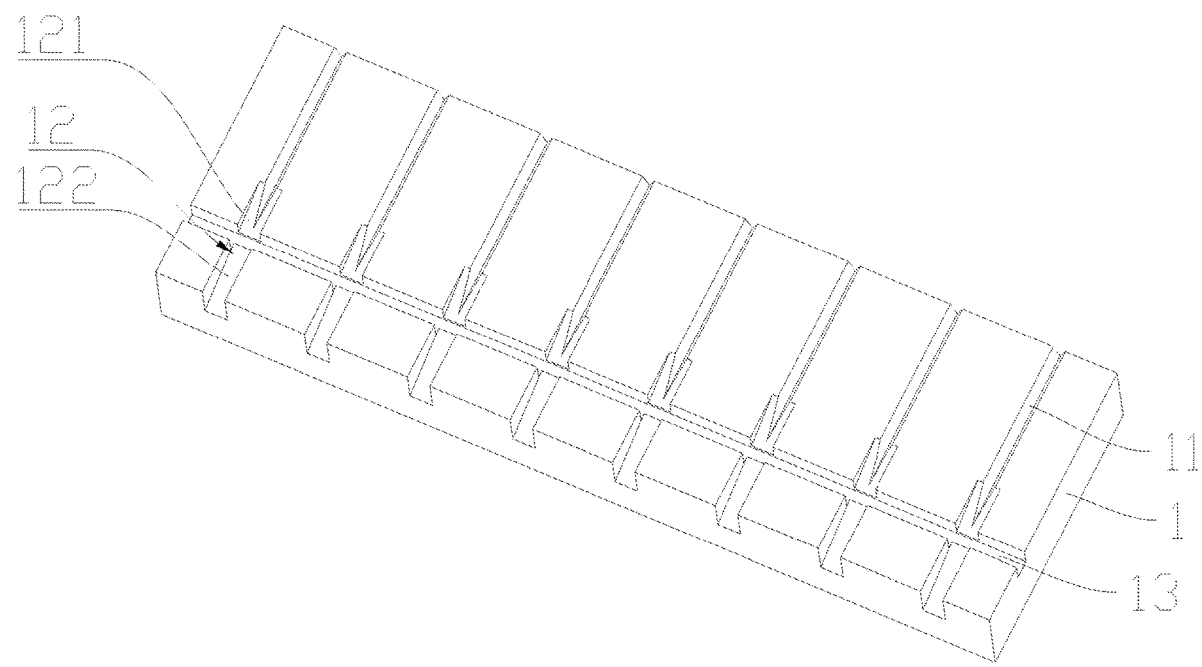
FIG. 1 illustrates a perspective view of a main body of a substrate for optical fiber array according to an embodiment of the present disclosure.
Figure 2:
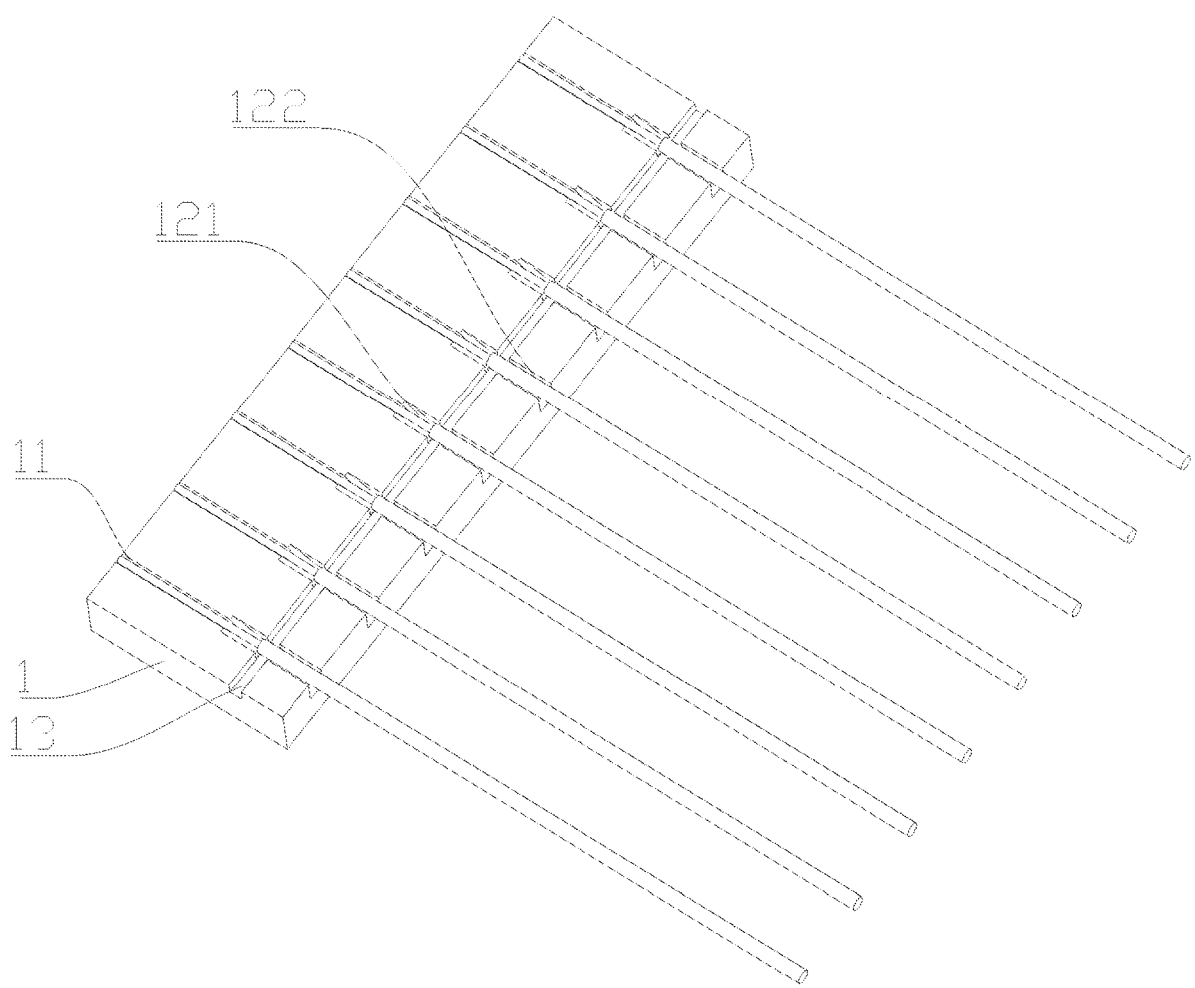
FIG. 2 illustrates another perspective view of the main body of the substrate for optical fiber array provided with optical fibers according to an embodiment of the present disclosure.
Figure 3:
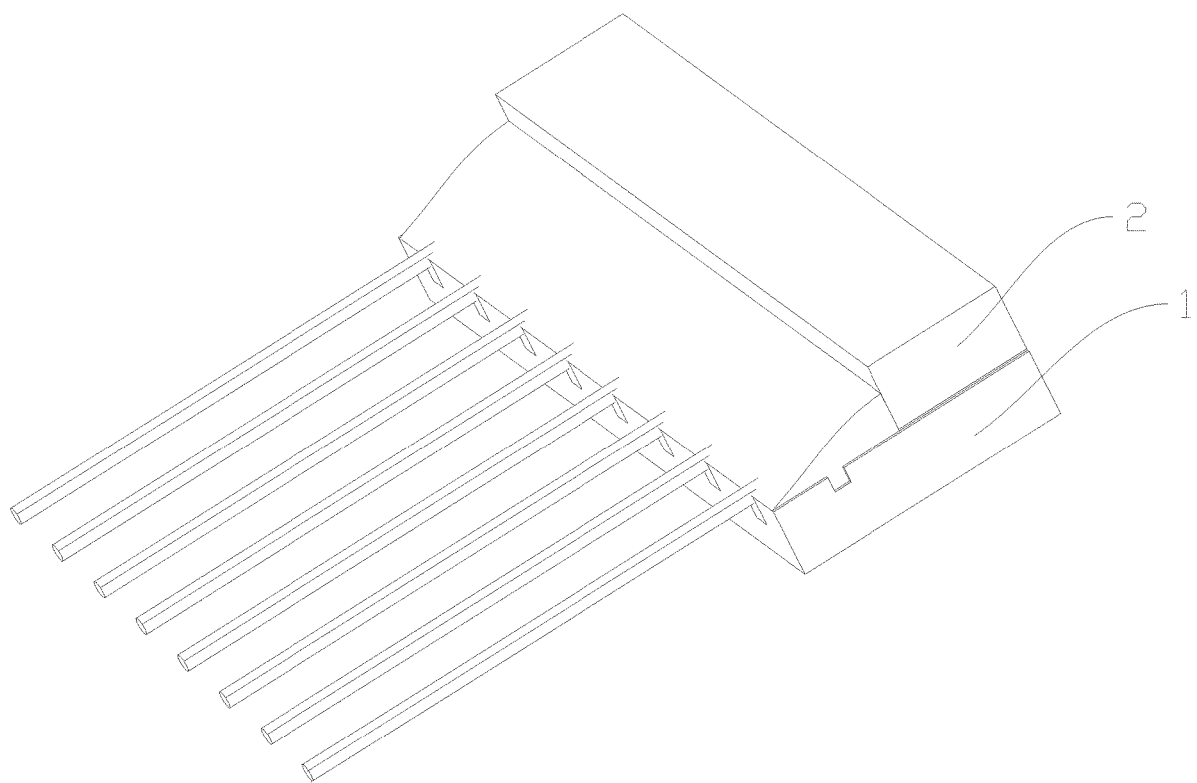
FIG. 3 illustrates a further perspective view of the main body of the substrate for optical fiber array provided with optical fibers in a fully installed status according to an embodiment of the present disclosure.

As illustrated in FIG. 1 to FIG. 3, a substrate for optical fiber array according to an embodiment of the present disclosure is used to fix optical fibers by epoxy. The substrate may include a main body (1), a first holding groove (11), and a second holding groove (12). The first holding groove (11) is notched along the width direction of the main body (1) for holding and for fixing the stripped optical fiber by epoxy. The second holding groove (12) is arc-shaped, is connected with the first holding groove (11), and extends along the notching direction of the first holding groove (11). The second holding groove (12) is used to hold the unstripped optical fiber, which may help to prevent the epoxy in the first holding groove (11) from spreading to the second holding groove (12). The second holding groove (12) is arc-shaped.

In an embodiment, the substrate for optical fiber array also includes a lid (2). the said lid (2) is arranged on top of the first holding groove (11) to cover and fix the stripped optical fiber and prevent the pollution or damage during application.

In an embodiment shown in FIG. 1, a groove (13) is arranged on the main body (1) along the length direction and is perpendicular to the second holding groove (12). Optionally, the groove (13) intersects the second holding groove (12) and may help to prevent the epoxy from spreading from the first holding groove (11) to the second holding groove (12).

The second holding groove (12) is divided by the groove (13) into the first holding section (121) and the second holding section (122). The bottom surface of the first holding section (121) is connected with the first holding groove (11). Since the second holding groove (12) is an arc-shaped groove, the junction surface of the first holding section (121) and the first holding groove (11) is an arc-shaped surface. Optionally, the radius of the arc groove, of which the second holding groove (12) is a part of, is 20 mm to 30 mm.

Additionally, the groove (13) may help the positioning of the optical fibers in that the unstripped optical fibers may be aligned along the extension direction of groove (13), thus improving the uniformity of the optical fiber array arrangement and ensuring a better looking.

To effectively prevent the overflow of epoxy, the groove (13) is square-shaped. In one embodiment, the depth of groove (13) is 0.2 mm to 0.3 mm.

As illustrated in FIG. 2, the first holding groove (11) is used to hold the stripped optical fiber, and the second holding groove (12) is used to hold the unstripped optical fiber. In an embodiment, the width of the first holding groove (11) is different from that of the second holding groove (12). To better match the optical fiber, the width of the second holding groove (12) may be greater than that of the first holding groove (11).

In an embodiment, to accommodate multiple optical fibers, the main body (11) of the substrate is provided with a plurality of equally spaced first holding grooves (11) along a length direction of the main body (1). The main body (1) is also provided with the second holding grooves (12). To match the first holding grooves (11), the quantity of the second holding grooves is same with the first holding grooves (11).

In an embodiment, the first holding groove (11) is V-shaped in order to prevent the optical fiber from shifting or being loosely fixed in the first holding groove (11). When placed in the first holding groove (11), the stripped optical fiber will be stuck to a certain extent due to the V-shape structure of the groove, thus preventing the movement.

To prepare the main body of the substrate for optical fiber array provided with optical fibers in a fully installed status as illustrated in FIG. 3, one may perform the following steps before the use of the substrate for optical fiber array. First, place the stripped optical fiber in the first holding groove (11) and unstripped optical fiber in the second holding groove (12) and align the optical fibers along the extension direction of the groove (13). Then, apply the epoxy in the first holding groove (11) and arrange the lid (2) on top of the first holding groove (11) after the epoxy is applied. Last, apply another layer of epoxy on the surface of the second holding groove (12). After the curing of epoxy, the substrate for optical fiber array may be used.

Various embodiments of the disclosure may have one or more of the following effects. In some embodiments, the disclosure may provide a substrate for optical fiber array, which may help to prevent epoxy from spreading to the rear of substrate and the optical fiber coating, thus reducing the cracks or breakages thereof. In other embodiments, The disclosed substrate may help to prevent epoxy overflow, thus reducing cracks or breakages in the coating of the optical fiber. In further embodiments, the disclosed substrate may effectively fix the optical fibers while ensuring their uniform positions. In other words, the disclosed substrate may help to ensure the optical fibers are firmly fixed and meanwhile neatly arranged.

The foregoing description of the exemplary embodiments of the present disclosure is for illustration purpose only. The descriptions are not intended to limit the present disclosure to the exactly forms disclosed, and it is obvious that many changes and variations may be made according to the above teachings. The purpose of selecting and describing the exemplary embodiments is to explain the specific principles and practical applications of the present disclosure, so that those skilled in the art may realize and utilize various exemplary embodiments of the present disclosure and various choices and changes.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A substrate for optical fiber array comprising a main body, a first holding groove, and a second holding groove, wherein:
    the first holding groove is notched along a width direction of the main body for holding a stripped optical fiber by epoxy;
    the second holding groove is an arc-shaped groove and connected with the first holding groove;
    the second holding groove extends along a notching direction of the first holding groove for holding an unstripped optical fiber; and
    the unstripped optical fiber is aligned along a straight line in the main body.

2. The substrate of claim 1, wherein the second holding groove is wider than the first holding groove.

3. The substrate of claim 1, further comprising a lid, wherein the lid is arranged on top of the first holding groove to cover and to fix the stripped optical fiber.

4. The substrate of claim 1, wherein the main body is provided with a plurality of the first holding grooves, the plurality of the first holding grooves being equally spaced along a length direction of the main body.

5. The substrate of claim 1, wherein a groove is notched along a length direction of the main body to prevent epoxy overflow.

6. The substrate of claim 5, wherein:
    the groove intersects the second holding groove;
    the groove divides the second holding groove into a first holding section and a second holding section; and
    a bottom surface of the first holding section is connected with the first holding groove.

7. The substrate of claim 5, wherein the groove has a depth of 0.2 mm to 0.3 mm.

8. The substrate of claim 5, wherein the groove is a square-shaped groove.

9. The substrate of claim 1, wherein the arc-shaped groove has a radius of 20 mm to 30 mm.

10. The substrate of claim 1, wherein the first holding groove is a V-shaped groove.

11. A substrate for optical fiber array comprising a main body, a first holding groove, and a second holding groove, wherein:

the first holding groove is notched along a width direction of the main body for holding a stripped optical fiber by epoxy;

the second holding groove is an arc-shaped groove and connected with the first holding groove;

the second holding groove extends along a notching direction of the first holding groove for holding an unstripped optical fiber; and the arc-shaped groove has a radius of 20 mm to 30 mm and an arc of the arc-shaped groove is aligned along the width direction.

\* \* \* \* \*